US006248379B1

(12) United States Patent
Capodieci et al.

(10) Patent No.: US 6,248,379 B1
(45) Date of Patent: Jun. 19, 2001

(54) PUFFED CEREAL CAKES

(75) Inventors: Roberto A. Capodieci, Glen Ellyn, IL (US); Lucio H. Yonemoto, Rio Grande do Sul; Catherine V. Baillie, Porto Alegre, both of (BR); Theodore Jach, Brasschaat (BE); Fabiana F. Gargaro, Rio Grande do Sul (BR)

(73) Assignee: N.V. MasterFoods S.A., Olen (BE)

( * ) Notice: Subject to any disclaimer, the term of this patent is extended or adjusted under 35 U.S.C. 154(b) by 0 days.

(21) Appl. No.: 09/456,789

(22) Filed: Dec. 8, 1999

(30) Foreign Application Priority Data

Dec. 8, 1998 (GB) ................................................ 9826976

(51) Int. Cl.⁷ ....................................................... A23L 1/18
(52) U.S. Cl. ............................ 426/93; 426/621; 426/625; 426/629; 426/512
(58) Field of Search .................................... 426/621, 625, 426/629, 93, 272, 274, 279, 280, 512

(56) References Cited

U.S. PATENT DOCUMENTS

| | | | | |
|---|---|---|---|---|
| 415,192 | * | 11/1889 | Evans | 426/625 |
| 2,478,438 | * | 8/1949 | Thompson | 426/629 |
| 3,093,093 | * | 6/1963 | Ryan | 426/512 |
| 3,505,076 | * | 4/1970 | Maloney | 426/281 |
| 3,650,763 | * | 3/1972 | Touba | 426/625 |
| 4,038,427 | * | 7/1977 | Martin | 426/307 |
| 4,238,514 | | 12/1980 | Martin et al. | 426/62 |
| 4,281,593 | * | 8/1981 | Gevaert | 99/349 |
| 4,640,842 | | 2/1987 | May | 426/534 |
| 4,652,456 | * | 3/1987 | Sailsbury | 426/512 |
| 4,667,588 | | 5/1987 | Hayashi | 99/372 |
| 4,734,289 | * | 3/1988 | Yamaguchi | 426/302 |
| 4,759,937 | * | 7/1988 | Spector | 426/274 |
| 4,847,103 | * | 7/1989 | Sarta | 426/445 |
| 4,849,233 | * | 7/1989 | Hemker | 426/93 |
| 4,888,180 | | 12/1989 | Wu | 426/618 |
| 4,902,528 | * | 2/1990 | Groesbeck | 426/462 |
| 5,130,153 | * | 7/1992 | McIlroy | 426/242 |
| 5,316,783 | * | 5/1994 | Kratochvil | 426/627 |
| 5,753,287 | * | 5/1998 | Chedid | 426/93 |
| 5,817,355 | * | 10/1998 | Zukerman | 426/518 |
| 5,871,793 | * | 2/1999 | Capodieci | 426/238 |
| 6,068,868 | * | 5/2000 | Capodieci | 426/238 |
| 6,083,552 | * | 7/2000 | Kershman | 426/93 |

FOREIGN PATENT DOCUMENTS

| | | | | |
|---|---|---|---|---|
| 0359740 | * | 2/1988 | (EP) . | |
| 2617014 | | 6/1987 | (FR) | A21D/13/08 |
| 2069812 | | 9/1981 | (GB) | A23L/1/182 |
| 2173387 | | 10/1986 | (GB) | A23L/1/10 |
| WO 88/00797 | * | 2/1988 | (WO) . | |
| WO 90/08477 | * | 8/1990 | (WO) . | |
| WO 92/08375 | * | 5/1992 | (WO) . | |
| 9825479 | | 6/1998 | (WO) | A23L/1/00 |

\* cited by examiner

*Primary Examiner*—Carolyn Paden
(74) *Attorney, Agent, or Firm*—Fulbright & Jaworski L.L.P.

(57) ABSTRACT

The invention provides a process for the preparation of puffed cereal cakes, preferably rice cakes, comprising the steps of: providing a cereal grain, preferably a milled parboiled rice, wherein the cereal grain is impregnated with a non-mineral food ingredient such as a sugar; introducing the grain into a mold; and puffing the cereal in the mold under pressure to form a shaped impregnated cereal cake. The cereal grains impregnated with organic food ingredients can be used to make puffed cereal cakes having improved taste, texture and nutritional properties.

61 Claims, No Drawings

PUFFED CEREAL CAKES

BACKGROUND OF THE INVENTION

1. Field of the Invention

The present invention relates to puffed cereal cakes, in particular to puffed rice cakes. The present invention also relates to processes for the manufacture of such puffed cereal cakes.

2. Description of the Related Art

Rice cakes are commercially available products formed from puffed rice grains that are bonded together by heat and pressure, without the use of a binding matrix. The rice cakes have low density, and low moisture content, and are typically the shape and size of a cookie or rusk. Similar puffed (also known as expanded) cereal cakes can be made with many other cereal grains including (but not limited to) wheat, millet, buckwheat, barley or corn.

Rice cakes are currently made by a process comprising the steps of: (1) providing a mold comprising a plurality of mold elements including a reciprocally moveable piston element for compressing rice gains inside the mold; (2) introducing a predetermined quantity of unpuffed rice to the mold, the average moisture content of this rice being from 12 to 17% by weight; (3) compressing the rice grains in the mold at from 3 MPa to 15 MPa (30 to 150 bar) pressure; (4) heating the rice grains in the mold to a temperature of 170–320° C.; (5) moving the piston element to expand the mold by a predetermined amount, whereupon the heated rice grains expand and bond to form the rice cake, followed by (6) removing the finished rice cake from the mold.

Typically, the steps of heating, compressing and expanding the mold are carried out substantially concurrently in a suitably adapted mold apparatus that can provide high pressures and temperatures, together with precisely controlled expansion of the mold in the puffing step. Such rice puffing molds are described in a number of patent specifications, including U.S. Pat. No. 4,281,593 and U.S. Pat. No. 4,667,588, the entire contents of which are expressly incorporated herein by reference.

A disadvantage of the above-described existing methods of forming rice cakes is that the edible inclusions that can be incorporated into or onto the rice cakes are very limited. Most edible materials, such as vitamins or chocolate, are degraded by the high temperatures used to form rice cakes. Furthermore, these high temperatures result in rapid build-up of burnt (carbonised) deposits on the mold, resulting in unacceptable equipment down time required for cleaning of the mold. As a result, existing rice cakes generally only contain rice and salt, with flavoring agents optionally applied to the surface of the rice cake after it has been formed. This results in limited consumer acceptability for existing rice cakes.

WO 98/25479 describes processes for the production of flavored puffed cereal cakes in which pre-puffed cereal grains are coated with a binder, and then bonded together with ultrasound at ambient temperatures to form puffed cereal cakes. The binder may comprise a sugar.

U.S. Pat. No. 4,640,842 (May) describes the production of flavored puffed cereal products, in particular flavored popcorn, by contacting a hulled cereal grain, that is to say a grain still having the bran (pericarp) attached thereto, with a flavorant such as sugar under aqueous liquid phase conditions at 15–95° C. to impregnate the starchy endosperm of the grain with the flavorant, followed by drying and puffing the flavored grains in conventional fashion. There is no disclosure of flavoring milled, parboiled cereal grains. Nor is there any suggestion that the flavored cereal grains could be formed into a puffed cereal cake.

U.S. Pat. No. 4,888,180 describes puffed cereal cakes wherein the improvement comprises pretreatment of the cereal grains by steaming the grains to partially gelatinize the starch therein. It is suggested that, either preceding or following steaming, the cereal grains may be mixed with seasonings, salt, flavors or colors to produce a desired flavor, texture or appearance in the final product.

U.S. Pat. No. 4,810,506 describes impregnating parboiled rice grains with an aqueous solution of an enzyme or enzymes that improve the cooking properties of the rice, including the expansion of crisped rice grains. The enzymes do not alter the flavor properties of the rice.

SUMMARY OF THE INVENTION

It is an object of the present invention to provide puffed cereal cakes having improved flavor compared to existing puffed cereal cakes.

It is a further object of the present invention to provide puffed cereal cakes having improved texture compared to existing puffed cereal cakes.

It is a further object of the present invention to provide puffed cereal cakes having improved nutritional properties compared to existing puffed cereal cakes.

Further, it is an object of the present invention to provide an improved process for the production of puffed cereal cakes having the above-defined improved properties.

Finally, it is an object of the present invention to provide an improved process for the production of puffed cereal cakes having a shorter puffing cycle time and reduced energy requirement for puffing compared to existing processes.

In order to accomplish the foregoing objects there is provided in accordance with one aspect of the present invention a process for the preparation of a puffed cereal cake comprising the steps of: providing a cereal grain impregnated with at least one organic food ingredient; introducing said grain into a mold; and puffing said cereal grain in said mold under pressure to form a shaped flavored cereal cake.

In specific embodiments of the present invention the cereal grain has a moisture content of 10 to 20 wt. % when it is introduced into the mold.

In other specific embodiments of the present invention the food ingredient is impregnated in an amount from 0.01 to 60 wt. % based on the dry weight of the cereal grain. In specific improved embodiments the food ingredient is impregnated in an amount of 0.5 to 35 wt. % or from 1 to 25 wt. % both based on the dry weight of the cereal grain.

In specific embodiments of the present invention the organic food ingredient has a molecular weight of less than 1,000.

In specific embodiments the organic food ingredients are selected in the group consisting of lipids, proteins, carbohydrates, vitamins, emulsifiers, edible dyes, organic flavorants and mixtures thereof.

In a specific embodiment sugar is used. The sugar is usually selected from a group consisting of sucrose, fructose, glucose, maltose, mannose, lactose, galctose, trehalose and mixtures thereof. Alternatively it could be selected from carbohydrate, syrup, maple syrup, partially inverted refinery syrup, honey, fruit juice, fruit syrup or a combination thereof.

In a specific embodiment of the present invention the process includes a step of providing the cereal gra followed by impregnating the cereal grain with a dispersion of the organic food ingredients.

In specific embodiments the cereal grain cm be selected from the group consisting of rice, wheat, millet, buckwheat, barley, com and mixtures thereof. In the preferred embodiment rice is the cereal grain.

In an alternative embodiment the cereal grain can be milled to substantially remove the bran (pericarp) therefrom.

In preferred embodiments the present invention of the cereal grain is at least partially parboiled.

An additional embodiment of the present invention includes puffed cereal cake obtained by the process described above.

The preferred embodiment of the puffed cereal cake is a puffed rice cake.

Other and further objects, features, and advantages will be apparent from the following description of the presently preferred embodiments of the invention, which are given for the purpose of disclosure.

DETAILED DESCRIPTION OF THE INVENTION

It will be readily apparent to one skilled in the art that various substitutions and modifications may be made to the invention disclosed herein without departing from the scope and spirit of the invention.

The present invention is based on the unexpected finding that puffed cereal cakes can be made from cereal grains that have been impregnated (infused) with an organic food ingredient. The resulting puffed cereal cakes can be manufactured without substantial modification of existing cereal cake manufacturing equipment, and have improved flavor and, frequently, improved texture (crispness) compared to existing rice cakes. Surprisingly, the impregnated food ingredients are not substantially degraded by the high temperature puffing process, nor do they give rise to unacceptable levels of carbonisation of the puffing mold. The organoleptic properties of the infused food ingredients are retained in the cereal cake puffing step.

Specifically, the present invention provides a process for the preparation of a puffed cereal cake comprising the steps of: providing a cereal grain impregnated with at least one organic food ingredient; followed by introducing the grain into a mold; and puffing the cereal grain in the mold under pressure to form a shaped cereal cake.

The cereal grain may be any starchy grain suitable for forming a puffed cereal cake, including (but not limited to) rice, wheat, millet, buckwheat, barley, corn, and mixtures thereof. Preferably, the cereal grain comprises rice, and more preferably it consists essentially of rice. Preferably, the cereal grain is a milled grain, i.e. a cereal grain in which the bran (pericarp) has been removed by milling to leave the whole starchy endosperm. Preferably, the cereal grain consists essentially of whole grains. Broken grains may be present, but powdered reconstituted or extruded grains preferably are not present.

The cereal grains are preferably parboiled. That is to say, the starch granules of the grain have preferably been gelatinised by soaking and steaming, followed by drying to a glassy state. The theory and practice of parboiling have been reviewed, for example, by K. R. Bhattacharya in *Rice Chemistry and Technology*, edited by Bienvenido O. Juliano, St. Paul (1985), pages 289–348. The degree of parboiling can vary, and certain grain types may not need to be parboiled. However, preferably, the cereal grain is substantially completely parboiled.

Preferably, the total amount of impregnated food ingredients in the puffed cereal cakes is 0.01 to 60 wt. %, preferably 0.1 to 35 wt. %, and more preferably 1 to 25% based on the dry weight of the cakes. The term "impregnated" or "infused" as used herein indicates that the food ingredient or ingredients are substantially all distributed within the starchy endosperm of the cereal grain.

The impregnated food ingredient is organic. That is to say, it includes carbon-containing molecules other than metal carbonates, i.e. it is non-mineral. Wholly inorganic food ingredients such as salt and minerals may also be present in the cereal cake, but only in addition to the organic molecules of the food ingredient. The food ingredient may comprise a lipid such as a flavoring oil dispersed in the aqueous solution, optionally with the aid of an emulsifier, or it may comprise a substance that is soluble in the aqueous solution. Each food ingredient preferably has molecular weight less than 1000, more preferably less than 350, so that it can diffuse readily into the endosperm of the cereal grain.

Preferred categories of impregnated food ingredients include lipids, vitamins, emulsifiers, proteins, carbohydrates, edible dyes, organic flavorants, and mixtures thereof The organic flavorants may be any of the flavorants listed in U.S. Pat. No. 4,640,842, the entire contents of which are expressly incorporated herein by reference. Preferred flavorants include flavoring oils, sugars and artificial sweeteners such as saccharin, acesulfame, sucralose and cyclamates. Preferably, the food ingredient comprise at least one sugar and/or at least one lipid.

The term "sugar" encompasses all food acceptable monosaccharides, disaccharides and oligosaccharides. Preferably, the sugar is selected from the group consisting of sucrose, fructose, glucose, maltose, mannose, lactose, galactose, trehalose and mixtures thereof. in other preferred embodiments, the impregnated food ingredients comprise a carbohydrate syrup (such as high fructose corn syrup and/or corn syrup solids), a maple syrup, a partially inverted refiner's syrup, fruit juice, fruit syrup, or a honey.

The sugar is preferably infused in an amount of at least 1 wt. % based on the dry weight of the cereal cakes, more preferably at least 5 wt. % and most preferably at least 10 wt. %. Sugar contents up to 40 wt. %, 50 wt. % or even 60 wt. % can be achieved by infusing sugar syrups into the cereal grains before puffing.

The term "lipid" encompasses all food acceptable oils, fats and waxes. Preferably, the lipid is an oil. Preferably, the lipid is associated with a food-acceptable emulsifier to assist infusion into the cereal grain. Preferably, the lipid is present in an amount of at least 1 wt. % based on the dry weight of the cereal cakes, more preferably at least 2 wt. %, and most preferably at least 5 wt. %.

Preferably, the impregnated cereal grains are provided by the steps of: providing a plain cereal grain, followed by infusing the food ingredients into the cereal grain. A grain whose starch structure is gelatinized has been found to improve impregnation (infusion), since the amorphous stucture allows diffusion of water and organic food ingredients into the cereal much faster than with nonparboiled grains. It has been found that, since parboiling geltanizes the cereal grain that the greater the degree of parboiling, the greater the potential for organic substances to diffuse into the cereal kernels. Preferably, the plain cereal grains are fully parboiled, that is to say they are substantially free from ungelatinized starch.

Preferably, the plain cereal grams have an initial moisture content of 7–40% by weight more preferably 8–25% by weight, still more preferably 10–20% by weight, and most preferably 10–16% weight. Preferably, the plain parboiled cereal grains are milled (polished).

Particularly preferred plain parboiled cereal grains for practising the process according to the present invention are whole milled, parboiled rice grains obtained by the process described in U.S. Pat. No. 5,130,153 or U.S. Pat. No. 5,316,783, the entire contents of which are expressly incorporated herein by reference.

Preferably, the plain cereal product is treated with a quantitative amount of the food ingredient(s), all of which is infused into the plain cereal grain during the impregnating step.

Preferably, the food ingredients are infused into the cereal grain in the presence of liquid water, which acts as a diluent and vehicle for the ingredients. Liquid water is preferably as a vehicle because, unlike steam or dry heat, it is an excellent solvent and achieves complete penetration into the cereal grains without the use of high temperatures that could cause volatilization of flavor components. The use of liquid water achieves a more uniform distribution of the food ingredients in the cereal grains.

Preferably, the infusion is carried out with a sufficient quantity of water to increase the moisture content of the cereal grains in the infusion step by at least 10%, more preferably by at least 15% or 20%, and most preferably by at least 25% (based on the dry weight of the plain cereal).

The impregnated cereal grains may, for example, be provided by coating the plain preferably parboiled, preferably milled cereal grain with a composition containing the food ingredients, e.g. in a rotating pan coater, followed by treating the cereal grain with water and/or heat to cause the ingredients to diffuse into the cereal grains.

However, the impregnating is preferably carried out by treating a plain, preferably parboiled, preferably milled, cereal grain with an aqueous solution or dispersion of the at least one organic food ingredient. The term "treating" encompasses either immersing the cereal grains in the aqueous medium or spraying the aqueous medium onto the cereal grains. Preferably, the food ingredients are present in the aqueous solution or dispersion at a total concentration of 0.01 to 60 wt. %, preferably 0.5 to 35 wt. %, more preferably 1 to 25 wt. % based on the dry weight of the cereal grain.

For example, sugar may be infused by treating the plain parboiled cereal grain with an aqueous solution that contains from 5 to 35% by weight of one or more dissolved sugars, preferably from 10 to 25 wt. % of total dissolved sugar. In other preferred embodiments the plain parboiled cereal grain may be treated with a sugar syrup containing 40% to 80% by weight of sugars to infuse higher concentrations of sugars into the grain. This can be used to produce an essentially "crystallised" cereal grain having a high sugar content.

Preferably, the treating step is carried out a temperature of from 0° to 195° C., more preferably from 20° C. to 110° C. In certain preferred embodiments, the treating step is carried out between 20° C. and the glass transition temperature of the cereal grain. The glass transition temperature can be determined by differential scanning calorimetry, and is typically in the range 50° C. to 80° C. Treating at lower temperatures inevitably takes a longer time to achieve sufficient impregnation compared to treating at higher temperatures. The step of treating is usually carried out for a period of less than 2 hours, preferably from 5 minutes to 30 minutes.

The examples of U.S. Pat. No. 4,640,842 describe soaking of grains at 54–58° C. (130–140° F.) for a period of 2 to 8 hours in order to achieve impregnation of the hulled (unmilled) cereal grains. This compares with preferred soaking for less than 2 hours, preferably less than 30 minutes for the milled cereal grains preferably used in the present invention. The aqueous treatment medium may be heated, for example with steam, during the infusion step.

Preferably, the amount of treating aqueous medium and treating conditions are such that the moisture content of the cereal grains immediately following the treating is from 10 to 75 wt. %, preferably from more than 30 to 50 wt. % based on the weight of the treated grains. Typically, the amount of treating aqueous medium absorbed is from 5% to 125%, preferably from 35% to 75% by weight based on the weight of the initial parboiled cereal grain.

In certain alternative embodiments of the present invention, an impregnated parboiled cereal grain is provided in a single step by parboiling a plain cereal grain as hereinbefore described, using an aqueous solution or dispersion of the organic food ingredient(s) as the parboiling medium.

The organic food ingredients are infused (impregnated) into the cereal grains. That is to say, at least 75%, preferably at least 90% and more preferably substantially all of the organic food ingredients are incorporated into the grains and not present as separate particles or as a coating on the grains. The distribution of the organic food ingredients within the starchy endosperm of the grains need not be uniform. For example, there may be a concentration gradient of the food ingredients from the center of the grains outwards.

In another aspect, the present invention provides a method of manufacturing a puffed cereal cake comprising the steps of providing a cereal grain impregnated with one or more food ingredients as described herein in relation to the first aspect of the invention, puffing the impregnated cereal grains separately, followed by bonding the puffed cereal grains into a puffed cereal cake. For example, the cereal grains may be puffed by heating at 150–270° C., or by gun-puffing. The puffed cereal grains may be bonded together into a puffed cereal cake by applying pressure and heat and/or ultrasound energy as described in WO98/25479.

The impregnated cereal grains may need to undergo a moisture content adjustment step after impregnation, in order to adjust the moisture content to the preferred range of 8–20% by weight, more preferably 12–18% by weight, required for effective puffing to form cereal cakes. Preferably, the moisture content of 10–20% is substantially homogeneous both within each grain and between grains. In certain embodiments, the step of adjusting the moisture content comprises drying the cereal grains in conventional fashion such as with hot air, followed by rehydrating the grains to 8–20% moisture content preferably 12–18%, by spraying water onto the grains. Alternatively, partial drying of the steeped grains to 8–20% moisture content can be carried out, for example with hot air. The grains may be tempered by standing at 15–95° C. for a time sufficient to equilibrate the moisture content across and between the grains at any stage in the process.

The cereal grains are then puffed in conventional fashion, as described in any of the references cited above. Preferably, the step of puffing is carried out at a temperature of 170–320° C., more preferably 230–300° C., for a time 1–20 seconds, preferably 2–10 seconds. Preferably, the initial puffing is carried under a pressure of about 3 to 15 MPa (30 to 150 bar), more preferably 4 to 10 MPa (40 to 100 bar), and the mold piston is then retracted by 3–15 mm to expand and bond the cereal grains into a cereal cake. The moisture content of the cereal cakes after puffing is typically from 2 to 10% by weight, more typically from 3 to 6% by weight.

It has been found, surprisingly, that the incorporation of organic food ingredients into cereal grains by impregnation before puffing does not result in an unacceptable level of charred residues on the puffing mold elements. Furthermore, it has surprisingly been found that the impregnated food additives do not undergo unacceptable thermal degradation in the cereal cake puffing step. It has also been found, surprisingly, that relatively volatile and/or heat sensitive flavors, such as fruit flavors, can be impregnated into the cereal grains before puffing in accordance with the present invention, and that these flavors are appreciably retained after the puffing step, and are distributed uniformly through the puffed cereal cake.

It has further been found, surprisingly, that the incorporation of a sugar into the starchy endosperm of the cereal grains results in a puffed cereal cake having improved crispiness, compared to previously known puffed cereal cakes. It has also been found that the presence of sugar results in cereal cake having a more attractive, darker color than cereal cakes made in conventional fashion.

Another preferred embodiment is a process for the preparation of puffed cereal cake comprising the steps of providing a cereal grain impregnated with at least one organic food ingredient selected from the group consisting of lipids, emulsifiers, edible dyes, proteins, carbohydrates, vitamins, organic flavoring, sugars, or combination thereof; wherein said organic food ingredients are impregnated in an amount from 0.01 to 35 wt. % based on the dry weight of the cereal grain; adjusting the total moisture count of such cereal grain after impregnation to about 10 to 20 wt. % based on the total weight of the impregnated cereal grain; and introducing said grain into a mold; and puffing said cereal grain in said mold under pressure to form a shaped, flavored cereal cake.

The present invention also provides a puffed cereal cake comprising at least one organic food ingredient incorporated into the puffed kernels of the cereal cake. The preferred cereals and ingredients are substantially as hereinbefore defined for the process according to the present invention. Such a puffed cereal cake has advantageous crispness and/or flavor and/or nutritive value. It is quite distinct from previously known cereal cakes, in which pre-puffed cereal grains were bonded together by a sticky coating or a matrix. Such previously known cakes are less crisp, and do not have a significant portion of the added food ingredient incorporated into the puffed kernels. The puffed cereal cakes according to the present invention preferably have puffed cereal grains bonded directly to another by heat and pressure, substantially without an intermediate layer of sticky material. The puffed cereal cakes according to the present invention preferably have a density of less than 0.2 g/cm$^3$, more preferably less than 0.15 g/cm$^3$.

The present invention also provides a puffed cereal cake that is obtainable by a process according to the present invention. Preferably, the puffed cereal cake according to the present invention is a puffed rice cake.

Specific examples of the present invention will now be described further in and by the following examples. In each example, a tasting panel assessed the following characteristics of the rice cakes: hardness, mouth drying, crispiness, graininess (griminess), time release of flavor, duration of flavor, irregularity and color. Other parameters, such as cake density, were assessed objectively by measurement.

EXAMPLE 1 (Comparative)

A conventional rice cake containing no infused organic food ingredients was prepared as follows.

A sample of rice was parboiled as described in the examples of U.S. Pat. No. 5,130,153. Briefly, the parboiling was carried out as follows. A 500 kg sample of the rice, from which the husks, but not the bran, had been removed was fed into a hot steeper bath containing water at 71° C. The residence time of the rice in the water was 4.5 minutes. During transit through the steeper, the moisture of the rice was raised to 25%.

The rice was then transported to a dewatering belt to remove surface water from the rice. The residence time of the rice on the belt was between 30–60 seconds. The rice was fed from the belt directly into a steamer, in which steam at 106° C. and about 0.20 bar overpressure was applied to the rice. The residence time of the rice in the steamer was 30 minutes. During its transit through the steamer, the moisture of the rice was raised to about 28% and its temperature was raised to 106° C.

The steamed rice was then fed into a continuous microwave unit operating at 133 to 136° C. and an overpressure of about 3.5 bar. The residence time of the rice in the microwave unit was 4 minutes. During its residence time in the microwave unit, the starch in the rice grains was fully gelatinized.

The rice was then passed to a pressure reduction system, wherein the pressure on the rice was released in 2–3 steps over a period of 1 to 6 minutes. During this time, the temperature of the rice fell to about 100° C., its moisture was reduced to about 25% and the pressure fell to atmospheric pressure. The rice was then further dried in the conventional grain dryer to 14% moisture, and then cooled to about 35° C. and milled in a conventional rice mill to remove the bran therefrom.

During the milling process, some of the rice kernels were broken into smaller pieces by the action of the mills. This broken rice was sorted from whole kernel rice by various methods known to those skilled in the art. The broken rice sorted from this process was used as the base cereal ingredient in Examples 1 and 2.

1000 grams of the broken rice at a moisture content of 12.9% was blended with 25 grams of water in a mixing bowl by hand for approximately 5 minutes (until the mixture was free-flowing). This rice was then put into a sealed container at room temperature for 2 hours for the moisture to equilibrate. Once equilibrated, the rice was fed into an Incomec Cerex-21-MI rice cake machine (Bramecon n.v.; Brackel, Belgium). The puffing conditions used were: 80–100 MPa pressure, 7 seconds heating & compression time prior to expansion, and 275° C. temperature. These conditions were found, through discussions with the equipment manufacturer and by experience, to be the best conditions for producing consistently strong, good quality rice cakes.

EXAMPLE 2

A puffed rice cake containing infused sugar in accordance with the present invention was prepared as follows.

1000 grams of broken rice parboiled as described in Example 1 and having a moisture content of 12.9% was blended with a treating solution. The treating solution contained 250 grams water, 2 grams salt, and 45 grams sugar (sucrose). The rice was immersed in the treating solution for approximately 10 minutes at ~100° C., with stirring, until all of the treating solution was absorbed by the rice.

Once the solution was absorbed, the infused rice was placed into a Ventilex batch oscillatory bed test dryer (Ventilex BV; Heerde, Holland). The rice was dried with for 35 minutes with the bed oscillating at 30 cycles per minute and at an average temperature of 50° C. The moisture of the rice was measured and found to be 14.9% water. 1000 grams of this dried rice was mixed with 7 grams of water to bring the moisture content to 15.5%. Additionally, this moistened rice was equilibrated for 2 hours at room temperature.

After equilibration, the rice was fed into the same Cerex 21-MI rice cake machine. When the infused rice was puffed at the same conditions as the rice without any infused ingredients (275° C., 80–100 Mpa pressure, 7 seconds), the rice cakes were burned and stuck to the hot die plates of the machine. Once the machine was cleaned, the test was performed again at 250° C. and 80–100 Mpa, but with as short of a heating & compression cycle as possible. This fastest setting was found to be between 3 and 3.5 seconds. The cakes formed at these conditions were crisper, crunchier and slightly more brown in color than the cakes made without any infused ingredients. Additionally, the burning and sticking to the die plates was minimal. Since all of the other steps in the process remained the same, the overall cycle time required to produce a rice cake was reduced from between 10 and 11 seconds to less than 7 seconds (30–35% faster cycle time). Furthermore, the lower puffing temperature and shorter puffing time for the infused rice cakes reduced the total energy requirement of the process significantly.

EXAMPLE 3

A sample of rice was parboiled and milled in conventional fashion, substantially as follows.

A 500 kg sample of brown rice that having the husks removed but not the bran (pericarp) removed therefrom was soaked at 24–29° C. with just sufficient water to raise the moisture content of the rice to 29% by weight. The rice was then gelatinized with steam at 120–130° C. in controlled volume, so as to heat the rice to 100° C. and condense thereon a quantity of water sufficient to raise the moisture content of the rice to 34–35% by weight. The fully gelatinized rice is then dried with hot air down to a moisture content of about 12%, and the bran is milled off the rice in conventional fashion to provide the milled, parboiled feedstock for Examples 3,4,5,6 and 8.

A treating solution was provided. The treating solution contained 65 g of sucrose, 4 g of salt and 233 g water. The sugar content of the treating solution was therefore 21.5 wt. %.

The rice was immersed in the treating solution for approximately 10 minutes at 95° C., with stirring, until all of the treating solution was absorbed by the rice.

Once the solution was absorbed, the infused rice was spread into a thin layer on a baking tray and placed in an impingement oven at 65° C. to dry. The rice was occasionally stirred during the drying procedure to ensure even drying over the span of approximately one hour. Once dried and cooled to room temperature, the moisture content of the rice was measured. Water was then added to the rice (at ambient temperature) to bring the moisture content to 16%. The rice was then left for 1–2 hours (again at room temperature) for the moisture to equilibrate in the rice kernel.

The equilibrated rice was next added to the feeding hopper of a second rice cake forming machine of conventional design, and used to produce rice cakes. The rice cake machine was set at 250° C. puffing temperature with a 10 mm puffing height, a pressure of 40 bar, and set for 5 cycles per minute.

The resulting puffed rice cake possessed excellent crispness, hardness and color. The taste of the rice cake was pleasantly sweet, without any stickiness on the surface of the rice cake. The dry mouth feel of the rice cakes was also reduced by the presence of sugar. Surprisingly, it was found that there was no increase in the rate of build up of deposits on the rice cake manufacturing mold when manufacturing the flavored rice cakes as compared to rice cakes flavored only with salt. The sugar content of the flavored rice cakes was 12.1 wt. %, and the density of the flavored rice cakes was 0.08 g/cc.

The diffusion of the flavoring solution into the parboiled grains was visualised by adding a dye to the flavoring solution, and sectioning the steeped rice grains after drying. Microscopic examination showed that the dye had diffused throughout the endosperm.

EXAMPLE 4

A further puffed rice cake containing infused sugar is prepared as follows.

A sugar solution containing 20.5 wt. % of sucrose in water is made up and heated to 80° C. by steam injection. The solution (16.2 kg) is then added to 30 kg of the parboiled rice prepared as in Example 3. The mixture is agitated, a further 3 liters of water are added, and the mixture is further agitated and heated by steam injection to a temperature of 80–90 ° C. for about 10 minutes to achieve complete infusion of the solution into the rice. The infused rice has a moisture content of about 45% by weight.

The infused rice is dried in a tumbler with fast flowing hot air at 100–140 ° C. for 35 minutes. The rice is then cooled to ambient temperature with a flow of air at ambient temperature. The final moisture content is 13–14 wt. %. The dried rice is introduced without any intermediate rehydration into a puffing machine and puffed at 250 ° C. with a 10 mm puffing height, a pressure of 40 bar and 6 puffing cycles per minute.

The final rice cakes have a moisture content of about 4 wt. % and an attractive color, texture and sweet taste.

EXAMPLE 5 (Comparative)

The procedure described above for Example 3 was repeated, but with treating of the rice in a solution containing only 1% of salt (sodium chloride) in water. There was no sugar in the treatment solution.

The other features of the process were the same as in Example 3.

The resulting rice cakes were similar in appearance to the rice cakes of Example 3, but a slightly paler color. The main difference other than flavor, was found to be that the comparative rice cakes containing only salt were less crisp and had a drier mouth feel than the rice cakes flavored with sugar. The density of the comparative rice cakes was 0.13 g/cc.

EXAMPLE 6

The effect of milling on the flavored rice cakes according to the present invention was investigated by carrying out the process of Example 3 on two types of whole grain rice to determine if the bran coating would have an impact on the rate of solution diffusion into the kernel. The rices tested were a parboiled standard whole grain (unmilled, brown) rice having a normal cooking time of 40 minutes, and a rolled brown rice having a normal cooking time of 20 minutes. Whereas the time required for the sugar solution to be absorbed by the normal milled parboiled rice was 10 minutes or less, the rolled brown rice took about 30 minutes to absorb the same amount of solution, and the whole brown rice showed only minimal absorption of the solution after 30 minutes.

EXAMPLE 7

A hydrogenated vegetable oil (SANCREME®, supplied by Bungee oil Group, Esteio, Brazil) was infused into parboiled rice grains at levels up to 3 wt. %. The rice could be puffed into cakes in conventional fashion, with no impact on rice cake texture.

EXAMPLE 8

Parboiled rice grains were infused with up to 0.9 wt. % of two different emulsifiers selected to have widely different hydrophilic-lipophilic balance (HLB) ratios. The chosen emulsifiers were a mono/di-glyceride (HA52 from Grinsted, Sao Paolo, Brazil) and Polysorbate 80 (obtained form Oxiteno, Sao Paolo, Brazil). The emulsifiers were found to assist impregnation of lipids into the rice grains, but did not in themselves influence the texture of the rice cakes.

EXAMPLE 9

1000 g of Uncle Ben's® NATURAL SELECT® Garlic & Butter Flavor seasoned rice (Uncle Ben's, Incorporated; Houston, Tex., USA) was mixed with 47 g of water to bring the moisture of the rice to 16% for puffing in the rice cake machine. The seasoned rice had been prepared by flavored parboiling to impregnate the flavorings into the rice grains. The mixture was stirred to distribute the water evenly and left at room temperature (−20 degrees C.) for about 90 minutes to allow the water to equilibrate and impregnate the flavorings into the rice. After the equilibration time, the rice was puffed in a rice cake machine at 250° C., 30 bars pressure and 7 seconds of puffing time. The rice cakes made in this way were crispier than rice cakes made from normal, unseasoned rice and had the "garlic & butter" flavor of the rice distributed throughout the rice cake. The flavored rice cakes had densities from 0.08–0.15 g/cm$^3$.

The above examples have been described for the purpose of illustration only. Many other examples falling within the scope of the accompanying claims will be apparent to the skilled reader. One skilled in the art will readily appreciate that the present invention is well adapted to carry out the objects and obtain the ends and advantages mentioned as well as those inherent therein. The puffed cereal cakes, methods, processes and procedures described herein are presently representative of the preferred embodiments are exemplary and are not intended as limitations on the scope of the invention. Changes therein and other procedures and uses will occur to those skilled in the art which are encompassed within the spirit of the invention and are defined by the scope of the claims.

All patents and publications mentioned in this specification are indicative of the level of those skilled in the art to which the invention pertains. All patents, publications herein are incorporated by reference to the same extent as if each individual publication was specifically and individually indicated to be incorporated by reference.

What is claimed is:

1. A process for the preparation of a puffed cereal cake comprising the steps of:
   providing a cereal grain impregnated with at least one organic food ingredient;
   introducing said grain into a mold; and
   puffing said cereal grain in said mold under pressure to form a shaped flavored cereal cake.

2. The process according to claim 1, wherein said cereal grain has a moisture content of 10 to 20 wt. % when it is introduced into said mold.

3. The process according to claim 1, wherein said at least one food ingredient is impregnated in an amount of from 0.01 to 60 wt. % based on the dry weight of the cereal grain.

4. The process according to claim 1, wherein said at least one food ingredient is impregnated in an amount of from 0.5 to 35 wt. % based on the dry weight of the cereal grain.

5. The process according to claim 1, wherein said at least one food ingredient is impregnated in an amount of from 1 to 25 wt. % based on the dry weight of the cereal grain.

6. The process according to claim 1 or 2, wherein the cereal grain comprises rice.

7. The process according to claim 6, wherein the rice is at least partially parboiled.

8. The process according to claim 6, wherein the rice has been milled to substantially remove the bran (pericarp) therefrom.

9. The process according to claim 8, wherein the rice is at least partially parboiled.

10. The process according to claim 1 or 2, wherein the cereal has been milled to substantially remove the bran (pericarp) therefrom.

11. The process according to claim 10, wherein the cereal grain is at least partially parboiled.

12. The process according to claim 1, wherein said at least one organic food ingredient has a molecular weight less than 1,000.

13. The process according to claim 1, wherein said at least one organic food ingredient has a molecular weight less than 350.

14. The process according to claim 1, wherein said at least one organic food ingredient is selected from the group consisting of lipids, proteins, carbohydrates, vitamins, emulsifiers, edible dyes, organic flavorants, and mixtures thereof.

15. The process according to claim 1, wherein said at least one organic food ingredient includes at least one sugar.

16. The process according to claim 15, wherein said sugar is selected from the group consisting of sucrose, fructose, glucose, maltose, lactose, mannose, galactose, trehalose and mixtures thereof.

17. The process according to claim 15, wherein said organic food ingredient is selected from the group consisting of a carbohydrate syrup, maple syrup, partially inverted refiner's syrup, honey, fruit juice, fruit syrup or a combination thereof.

18. The process of claim 15, wherein said at least one sugar is impregnated in an amount of from 1 to 60 wt. % based on the weight of the cereal cake.

19. The process according to claim 1, wherein said step of providing said cereal grain comprises the steps of providing a plain cereal grain, followed by impregnating the plain cereal grain with a solution or dispersion of the said organic food ingredients in liquid water.

20. The process according to claim 19, wherein said step of providing an impregnated cereal grain comprises parboiling the cereal grain in an aqueous solution comprising at least one organic food ingredient.

21. The process according to claim 19, wherein said plain cereal grain has a moisture content of from 7 to 40 wt. % before said step of impregnating.

22. The process according to any one of claims 1, 19 or 21, wherein said cereal grain is at least partially parboiled.

23. The process according to claim 22, wherein said step of providing an impregnated cereal grain comprises parboiling the cereal grain in an aqueous solution comprising at least one organic food ingredient.

24. A puffed cereal cake obtained by the process of claim 23.

25. The puffed cereal cake of claim 24 wherein the cereal is rice.

26. The puffed cereal cake obtained by the process of claim 22.

27. The puffed cereal cake of claim 26 wherein the cereal is rice.

28. The process according to claim 19, wherein said impregnating is carried out at a temperature of from 0° C. to 195° C.

29. The process according to claim 19, wherein said impregnating is carried out at a temperature of from 20° C. to the glass transition temperature of the cereal.

30. A puffed cereal cake obtained by the process of any of claims 1 or 19 to 29.

31. The process according to any one of claims 19 to 29, wherein said step of impregnating is carried out for a period of less than 2 hours.

32. The process according to any one of claims 19 to 29, wherein said step of impregnating is carried out for a period of from 5 minutes to 30 minutes.

33. The process according to any one of claims 19 to 29, wherein said aqueous medium contains from 1 to 35 wt. % of one or more sugars.

34. The process according to any one of claims 19 to 29, wherein said cereal imbibes from 5% to 125% by weight of said aqueous medium, based on the weight of the plain cereal grain, in said step of impregnating.

35. The process according to any one of claims 19 to 29, wherein the total moisture content of said cereal immediately following said impregnating is from 10 to 65 wt. %.

36. The process according to any one of claims 19 to 29, wherein the total moisture content of said cereal immediately following said impregnating is from 25 to 40 wt. %, based on the total weight of the impregnated cereal grain.

37. The process according to any one of claims 1 or 19, further comprising the step of adjusting the moisture content of the cereal grain to from 10 to 20 wt. % after said step of impregnating.

38. The process according to claim 37, wherein said step of adjusting the moisture content comprises drying the cereal grains, followed by rehydrating the cereal grains to 10–20 wt. % moisture content for puffing.

39. The process of claim 1, wherein the food ingredient comprises a lipid.

40. The process of claim 1, wherein the step of impregnating comprises increasing the moisture content of the cereal grain by at least 15%, based on the dry weight of the plain cereal grain.

41. A process for the preparation of a puffed cereal cake comprising the steps of:
   providing a cereal grain impregnated with at least one organic food ingredient selected from the group consisting of lipids, emulsifiers, edible dyes, proteins, carbohydrates, vitamins, organic flavorings, sugars or a combination thereof, wherein said organic food ingredient is impregnated in an amount of from 0.01 to 35 wt. % based on the dry weight of the cereal grain;
   adjusting the total moisture content of said cereal grain after impregnation to about 10 to 20 wt. % based on the total weight of the impregnated cereal grain;
   introducing said grain into a mold; and
   puffing said cereal grain in said mold under pressure to form a shaped flavored cereal cake.

42. The process according to claim 41, wherein the step of providing said cereal grain comprises the steps of providing a plain cereal grain, followed by impregnating the plain cereal grain with an aqueous solution or dispersion of the said organic food ingredients.

43. The process according to claim 41, wherein the cereal grain has been milled to substantially remove the brain (pericarp) therefrom.

44. The process according to claim 41, wherein said at least one organic food ingredient has a molecular weight less than 1,000.

45. The process according to claim 41, wherein said at least one organic food ingredient has a molecular weight less than 350.

46. The process according to claim 41, wherein said cereal grain is at least partially parboiled.

47. The process according to claim 41, wherein said sugar is selected from the group consisting of sucrose, fructose, glucose, maltose, lactose, galactose, mannose and mixtures thereof.

48. The process according to claim 41, wherein said organic food ingredient is selected form the group consisting of a carbohydrate syrup, maple syrup, partially inverted refiner's syrup, honey, fruit juice, fruit syrup or a combination thereof.

49. The process according to claim 41, wherein said step of providing said cereal grain comprises the steps of providing a plain parboiled cereal grain, followed by impregnating the plain parboiled cereal grain with an aqueous solution or dispersion of the said organic food ingredients.

50. The process according to claim 49, wherein said impregnating is carried out at a temperature of from 0° C. to 195° C.

51. The process according to claim 49, wherein said step of impregnating is carried out for a period of up to 2 hours.

52. The process according to claim 49, wherein said aqueous medium contains from 1 to 35 wt. % of one or more sugars.

53. The process according to claim 49, wherein said cereal imbibes from 5% to 125% by weight of said aqueous medium, based on the weight of the plain cereal grain, in said step of impregnating.

54. The process according to claim 49, further comprising the step of adjusting the moisture content of the cereal grain to from 10 to 20 wt. % after said step of impregnating.

55. The process according to claim 54 wherein said step of adjusting the moisture content comprises drying the cereal grains, followed by rehydrating the cereal grains to 10–20 wt. % moisture content for puffing.

56. The process according to claim 1, 19, 41 or 55 wherein said step of puffing is carried out at a temperature of 170–320° C., for a time of 1–20 seconds.

57. The process according to any of claims 41 to 55, wherein the cereal grain comprises rice.

58. The process of any of claims 1, 19 or 41, wherein the cereal grain is selected from the group consisting of rice, wheat, millet, buckwheat, barley, corn and mixtures thereof.

59. The process of claim 58, wherein the cereal grain has been milled to substantially remove the bran (pericarp) therefrom.

60. The process of claim 59, wherein the cereal grain has been at least partially parboiled.

61. The process of claim 60, wherein the cereal grain has been substantially completely parboiled.

* * * * *